United States Patent
Wang et al.

(10) Patent No.: US 10,626,262 B2
(45) Date of Patent: Apr. 21, 2020

(54) THERMOPLASTIC COMPOSITIONS WITH LOW DIELECTRIC CONSTANT AND HIGH STIFFNESS AND THE SHAPED ARTICLE THEREFORE

(71) Applicant: SABIC GLOBAL TECHNOLOGIES B.V., Bergen op Zoom (NL)

(72) Inventors: Jian Wang, Shanghai (CN); Shijie Song, Shanghai (CN)

(73) Assignee: SABIC Global Technologies B.V., Bergen op Zoom (NL)

(*) Notice: Subject to any disclaimer, the term of this patent is extended or adjusted under 35 U.S.C. 154(b) by 0 days.

(21) Appl. No.: 16/458,556

(22) Filed: Jul. 1, 2019

(65) Prior Publication Data
US 2020/0010658 A1 Jan. 9, 2020

(30) Foreign Application Priority Data

Jul. 6, 2018 (EP) .................................. 18182147

(51) Int. Cl.
*C08L 23/14* (2006.01)

(52) U.S. Cl.
CPC ........... *C08L 23/14* (2013.01); *C08L 2205/03* (2013.01); *C08L 2205/24* (2013.01)

(58) Field of Classification Search
CPC ... C08L 23/14; C08L 2205/03; C08L 2205/24
USPC ....................................................... 524/505
See application file for complete search history.

(56) References Cited

U.S. PATENT DOCUMENTS

| | | | |
|---|---|---|---|
| 6,492,030 B1 | 12/2002 | Hashimoto et al. | |
| 7,235,624 B2 | 6/2007 | Ortiz et al. | |
| 2007/0185257 A1* | 8/2007 | Wursche | ................. C08L 67/02 524/539 |
| 2009/0021443 A1* | 1/2009 | Sakurada | ................. H01Q 1/38 343/785 |
| 2016/0194489 A1 | 7/2016 | Ho et al. | |
| 2016/0237311 A1 | 8/2016 | Mizori | |
| 2016/0264453 A1 | 9/2016 | Peters et al. | |

FOREIGN PATENT DOCUMENTS

| | | |
|---|---|---|
| CN | 105367897 A | 3/2016 |
| CN | 106543554 A | 3/2017 |
| EP | 2433982 B1 | 12/2014 |
| WO | 02/50182 A1 | 6/2002 |
| WO | WO 2015/048575 A1 | 4/2015 |
| WO | 2017/203467 A1 | 11/2017 |

OTHER PUBLICATIONS

European Patent Application No. 18182147.1; Extended Search Report; dated Jan. 2, 2019; 5 pages.

* cited by examiner

*Primary Examiner* — Hui H Chin

(74) *Attorney, Agent, or Firm* — BakerHostetler

(57) ABSTRACT

A thermoplastic composition includes: from 48.9 wt % to 93.9 wt % of a thermoplastic resin component including polypropylene, polypropylene copolymer, blends thereof or combinations thereof; from 5 wt % to 50 wt % glass fiber; from 1 wt % to 30 wt % impact modifier; and from 0.1 wt % to 10 wt % of a polyolefin-siloxane copolymer. The thermoplastic composition has a dielectric constant (Dk) of less than 2.8 at from 1-5 gigahertz (GHz) and a dissipation factor (Df) of less than 0.003 at from 1-5 GHz, the combined weight percent value of all components does not exceed 100 wt %, and all weight percent values are based on the total weight of the composition. Articles including the thermoplastic composition—and in particular telecommunications devices including the thermoplastic composition—are also described.

16 Claims, No Drawings

THERMOPLASTIC COMPOSITIONS WITH LOW DIELECTRIC CONSTANT AND HIGH STIFFNESS AND THE SHAPED ARTICLE THEREFORE

RELATED APPLICATION

This application claims priority to European Application No. 18182147 filed Jul. 6, 2018, the disclosure of which is incorporated herein by this reference in its entirety.

FIELD OF THE DISCLOSURE

The present disclosure relates to polypropylene-based thermoplastic compositions, and in particular to polypropylene-based thermoplastic compositions including glass fibers and a polyolefin-siloxane copolymer that have good dielectric properties.

BACKGROUND OF THE DISCLOSURE

In electronics and telecommunication applications, plastics have been widely used to make structural or functional components of antenna or radiofrequency (RF) related devices. With each new generation of mobile communication technology, working frequencies continue to increase. For example the next generation (5G) mobile network is expected to have a working frequency of greater than 20 gigahertz (GHz), which is much higher than the current 3G and 4G networks running at around 2-3 GHz. In these high RF frequency environments the electro-magnetic (EM) wave or the signal generated by the antenna will be highly influenced by the surrounding materials such as plastics and metals. Intrinsically, plastics are dielectric materials, which can temporarily store EM energy. Polymeric materials having a high dielectric constant (Dk) and dissipation factor (Df) will rapidly consume the EM energy and change the strength and phase state of the EM wave, resulting in decreased antenna performance. As a result, thermoplastic compositions with low Dk and low Df properties are desired, which could improve antenna performance in future high frequency networks.

International patent application publication WO2017/203467 describes polypropylene (PP)-based thermoplastic compositions with low Dk and low Df properties and good mechanical performance. It is difficult to further improve the stiffness, ductility (especially low temperate impact strength), and thermal performance of these PP compositions, however.

These and other shortcomings are addressed by aspects of the disclosure.

SUMMARY

Aspects of the disclosure relate to thermoplastic compositions including: from 48.9 wt % to 93.9 wt % of a thermoplastic resin component including polypropylene, polypropylene copolymer, blends thereof or combinations thereof; from 5 wt % to 50 wt % glass fiber; from 1 wt % to 30 wt % impact modifier; and from 0.1 wt % to 10 wt % of a polyolefin-siloxane copolymer. The thermoplastic composition has a dielectric constant (Dk) of less than 2.8 at from 1-5 gigahertz (GHz) and a dissipation factor (Df) of less than 0.003 at from 1-5 GHz, the combined weight percent value of all components does not exceed 100 wt %, and all weight percent values are based on the total weight of the composition.

DETAILED DESCRIPTION

The present disclosure relates to thermoplastic compositions with low dielectric constant (Dk) and dissipation factor (Df) properties and improved thermal and mechanical performance for electronic or telecommunications-related applications.

The present disclosure can be understood more readily by reference to the following detailed description of the disclosure and the Examples included therein. In various aspects, the present disclosure pertains to thermoplastic compositions including: from 48.9 wt % to 93.9 wt % of a thermoplastic resin component including polypropylene, polypropylene copolymer, blends thereof or combinations thereof; from 5 wt % to 50 wt % glass fiber; from 1 wt % to 30 wt % impact modifier; and from 0.1 wt % to 10 wt % of a polyolefin-siloxane copolymer. The thermoplastic composition has a dielectric constant (Dk) of less than 2.8 at from 1-5 gigahertz (GHz) and a dissipation factor (Df) of less than 0.003 at from 1-5 GHz, the combined weight percent value of all components does not exceed 100 wt %, and all weight percent values are based on the total weight of the composition.

Before the present compounds, compositions, articles, systems, devices, and/or methods are disclosed and described, it is to be understood that they are not limited to specific synthetic methods unless otherwise specified, or to particular reagents unless otherwise specified, as such can, of course, vary. It is also to be understood that the terminology used herein is for the purpose of describing particular aspects only and is not intended to be limiting.

Various combinations of elements of this disclosure are encompassed by this disclosure, e.g., combinations of elements from dependent claims that depend upon the same independent claim.

Moreover, it is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

All publications mentioned herein are incorporated herein by reference to disclose and describe the methods and/or materials in connection with which the publications are cited.

Definitions

It is also to be understood that the terminology used herein is for the purpose of describing particular aspects only and is not intended to be limiting. As used in the specification and in the claims, the term "comprising" can include the embodiments "consisting of" and "consisting essentially of" Unless defined otherwise, all technical and scientific terms used herein have the same meaning as commonly understood by one of ordinary skill in the art to which this disclosure belongs. In this specification and in the claims which follow, reference will be made to a number of terms which shall be defined herein.

As used in the specification and the appended claims, the singular forms "a," "an" and "the" include plural referents unless the context clearly dictates otherwise. Thus, for example, reference to "an impact modifier" includes mixtures of two or more impact modifiers.

As used herein, the term "combination" is inclusive of blends, mixtures, alloys, reaction products, and the like.

Ranges can be expressed herein as from one value (first value) to another value (second value). When such a range is expressed, the range includes in some aspects one or both of the first value and the second value. Similarly, when values are expressed as approximations, by use of the antecedent 'about,' it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "about" and "at or about" mean that the amount or value in question can be the designated value, approximately the designated value, or about the same as the designated value. It is generally understood, as used herein, that it is the nominal value indicated ±10% variation unless otherwise indicated or inferred. The term is intended to convey that similar values promote equivalent results or effects recited in the claims. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. It is understood that where "about" is used before a quantitative value, the parameter also includes the specific quantitative value itself, unless specifically stated otherwise.

Disclosed are the components to be used to prepare the compositions of the disclosure as well as the compositions themselves to be used within the methods disclosed herein. These and other materials are disclosed herein, and it is understood that when combinations, subsets, interactions, groups, etc. of these materials are disclosed that while specific reference of each various individual and collective combinations and permutation of these compounds cannot be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the disclosure. Thus, if there are a variety of additional steps that can be performed it is understood that each of these additional steps can be performed with any specific aspect or combination of aspects of the methods of the disclosure.

References in the specification and concluding claims to parts by weight of a particular element or component in a composition or article, denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

A weight percent of a component, unless specifically stated to the contrary, is based on the total weight of the formulation or composition in which the component is included.

As used herein, "polypropylene" can be used interchangeably with poly(propene).

As used herein the terms "weight percent," "wt %," and "wt. %," which can be used interchangeably, indicate the percent by weight of a given component based on the total weight of the composition, unless otherwise specified. That is, unless otherwise specified, all wt % values are based on the total weight of the composition. It should be understood that the sum of wt % values for all components in a disclosed composition or formulation are equal to 100.

Unless otherwise stated to the contrary herein, all test standards are the most recent standard in effect at the time of filing this application.

Each of the materials disclosed herein are either commercially available and/or the methods for the production thereof are known to those of skill in the art.

It is understood that the compositions disclosed herein have certain functions. Disclosed herein are certain structural requirements for performing the disclosed functions and it is understood that there are a variety of structures that can perform the same function that are related to the disclosed structures, and that these structures will typically achieve the same result.

Thermoplastic Compositions Having Good Dielectric Properties

Aspects of the disclosure relate to thermoplastic compositions including: from 48.9 wt % to 93.9 wt % of a thermoplastic resin component including polypropylene, polypropylene copolymer, blends thereof or combinations thereof; from 5 wt % to 50 wt % glass fiber; from 1 wt % to 30 wt % impact modifier; and from 0.1 wt % to 10 wt % of a polyolefin-siloxane copolymer. The thermoplastic composition has a dielectric constant (Dk) of less than 2.8 at from 1-5 gigahertz (GHz) and a dissipation factor (Df) of less than 0.003 at from 1-5 GHz, the combined weight percent value of all components does not exceed 100 wt %, and all weight percent values are based on the total weight of the composition.

In some aspects the thermoplastic composition includes from about 65 wt % to 85 wt % of the thermoplastic resin component.

Any suitable glass fiber may be included in the composition. In some aspects the glass fiber is sized so as to be compatible with the thermoplastic resin component (i.e., the glass fiber has polyolefin sizing or with sizing that is compatible with polyolefin). In a particular aspect the glass fiber is a flat glass fiber, a low Dk/Df glass fiber, or a combination thereof.

The impact modifier is included to enhance the mechanical properties of the thermoplastic composition. Any suitable impact modifier or combination thereof could be used. Impact modifiers may be high molecular weight elastomeric materials derived from olefins, monovinyl aromatic mononers, acrylic and methacrylic acids and their ester derivatives, as well as conjugated dienes that are fully or partially hydrogenated. The elastomeric materials can be in the form of homopolymers or copolymers, including random, block, radial block, graft, and core-shell copolymers.

A specific type of impact modifier may be an elastomer-modified graft copolymer including (i) an elastomeric (i.e., rubbery) polymer substrate having a Tg less than about 10° C., less than about 0° C., less than about −10° C., or between about −40° C. to −80° C. and (ii) a rigid polymer grafted to the elastomeric polymer substrate. Materials suitable for use as the elastomeric phase include, for example, conjugated diene rubbers, for example polybutadiene and polyisoprene, copolymers of a conjugated diene with less than about 50 wt % of a copolymerizable monomer, for example a monovinylic compound such as styrene, acrylonitrile, n-butyl acrylate, or ethyl acrylate, olefin rubbers such as ethylene propylene copolymers (EPR) or ethylene-propylene-diene monomer rubbers (EPDM), ethylene-vinyl acetate rubbers, silicone rubbers, elastomeric Ci-Cs alkyl(meth)acrylates, elastomeric copolymers of Ci-Cs, alkyl(meth)acrylates with butadiene and/or styrene, or combinations including at least one of the foregoing elastomers. Materials suitable for use as the rigid phase include, for example, monovinyl aromatic monomers such as styrene and alpha-methyl styrene, and monovinylic monomers such as acrylonitrile, acrylic acid, methacrylic acid, and the Ci-C6 esters of acrylic acid and methacrylic acid, specifically methyl methacrylate. Other exemplary impact modifiers include styrene-butadiene-styrene (SBS), styrene-butadiene rubber (SBR), styrene-ethylene-butadiene-styrene (SEBS), syndiotactic polystyrene (SPS), styrene ethylene propylene styrene (SEPS), ABS (acrylonitrile-butadiene-styrene), acrylonitrile-ethylene-propylene-diene-styrene (AES), styrene-isoprene-styrene (SIS), methyl methacrylate-butadiene-styrene (MBS), and styrene-acrylonitrile (SAN).

In certain aspects the impact modifier includes styrene-ethylene/butylene-styrene (SEBS), syndiotactic polystyrene (SPS), styrene-ethylene-propylene-styrene (SEPS), or a combination thereof. In a particular aspect the impact modifier includes styrene-ethylene-butadiene-styrene (SEBS). In further aspects the impact modifier is a low flow SEBS compound having a melt flow index less than 1 gram per 10 minute (g/10 min) at 230 degrees Celsius (° C.) and 5 kilograms (kg).

in some aspects the thermoplastic composition includes from 5 wt % to 15 wt % impact modifier.

Any suitable polyolefin-siloxane copolymer can be included in the thermoplastic composition. In one aspect the thermoplastic composition includes Tegomer® PP-Si 401, available from Evonik. The thermoplastic composition includes in some aspects from 1 wt % to 5 wt % of the polyolefin-siloxane copolymer.

The thermoplastic composition may include a β-nucleating agent for polypropylene in some aspects. In particular aspects the thermoplastic composition includes from greater than 0 wt % to 0.5 wt % of the β-nucleating agent for polypropylene. In certain aspects the thermoplastic composition includes from 0.1 wt % to 0.2 wt % of the (3-nucleating agent for polypropylene. The inclusion of the β-nucleating agent may enhance the impact performance (e.g., notched Izod impact strength) of the thermoplastic composition.

The polyolefin-siloxane copolymer may enhance various properties of the thermoplastic composition. These properties include, but are not limited to, one or more of heat deflection temperature, impact strength (e.g., notched Izod impact strength), flexural strength, tensile strength, and tensile elongation.

In particular aspects the thermoplastic composition has a heat deflection temperature (HDT) that is from 10% to 100% greater than a substantially identical reference composition that does not include the polyolefin-siloxane copolymer. As used herein, a "substantially identical reference composition," is a reference composition that includes the same components, and same amounts of each component, as the disclosed thermoplastic composition, except that the reference composition does not include the recited component (i.e., the polyolefin-siloxane copolymer). HDT may be determined in accordance with ASTM D648 or ISO 75. In particular aspects HDT is determined using a 1.82 or 1.8 megapascal (MPa) load and a 3.2 millimeter (mm) or 80 mm×10 mm×4 mm specimen.

In some aspects the thermoplastic composition has a notched Izod impact strength that is from 5% to 100% greater than a substantially identical reference composition that does not include the polyolefin-siloxane copolymer. Notched Izod impact strength may be determined in accordance with ASTM D256 or ISO 180.

The thermoplastic composition in certain aspects has a flexural strength that is from 40% to 100% greater than a substantially identical reference composition that does not include the polyolefin-siloxane copolymer. Flexural strength may be determined in accordance with ASTM D790.

In particular aspects the thermoplastic composition has a tensile strength that is from 20% to 80% greater than a substantially identical reference composition that does not include the polyolefin-siloxane copolymer. Tensile strength may be determined in accordance with ASTM D638.

In further aspects the thermoplastic composition has a tensile elongation that is from 40% to 100% greater than a substantially identical reference composition that does not include the polyolefin-siloxane copolymer. Tensile elongation may be determined in accordance with ASTM D638.

The thermoplastic composition may be made according to any conventional processes, including but not limited to extrusion, injection molding, lamination, co-extrusion, thermo-forming, and hot pressing processes.

Articles Including The Thermoplastic Composition

Aspects of the disclosure further relate to articles including the thermoplastic composition. In some aspects the article is a telecommunications device. In particular aspects the article is an antenna.

Various combinations of elements of this disclosure are encompassed by this disclosure, e.g., combinations of elements from dependent claims that depend upon the same independent claim.

Aspects Of The Disclosure

In various aspects, the present disclosure pertains to and includes at least the following aspects.

Aspect 1. A thermoplastic composition comprising:
from 48.9 wt % to 93.9 wt % of a thermoplastic resin component comprising polypropylene, polypropylene copolymer, blends thereof or combinations thereof;
from 5 wt % to 50 wt % glass fiber;
from 1 wt % to 30 wt % impact modifier; and from 0.1 wt % to 10 wt % of a polyolefin-siloxane copolymer, wherein the thermoplastic composition has a dielectric constant (Dk) of less than 2.8 at from 1-5 gigahertz (GHz) and a dissipation factor (Df) of less than 0.003 at from 1-5 GHz, the combined weight percent value of all components does not exceed 100 wt %, and all weight percent values are based on the total weight of the composition.

Aspect 2. The thermoplastic composition according to Aspect 1, wherein the composition comprises 65 wt % to 85 wt % of the thermoplastic resin component.

Aspect 3. The thermoplastic composition according to Aspect 1 or 2, wherein the glass fiber is sized so as to be compatible with the thermoplastic resin component.

Aspect 4. The thermoplastic composition according to any of Aspects 1 to 3, wherein the composition comprises from 5 wt % to 15 wt % impact modifier.

Aspect 5. The thermoplastic composition according to any of Aspects 1 to 4, wherein the impact modifier is selected from the group consisting of: styrene-ethylene/butylene-styrene (SEBS); syndiotactic polystyrene (SPS); styrene-ethylene-propylene-styrene (SEPS); and combinations thereof Aspect 6. The thermoplastic composition according to any of Aspects 1 to 5, wherein the impact modifier is a low flow SEBS compound having a melt flow index less than 1 gram per 10 minute (g/10 min) at 230 degrees Celsius (° C.) and 5 kilograms (kg).

Aspect 7. The thermoplastic composition according to any of Aspects 1 to 3, wherein the composition comprises from 1 wt % to 5 wt % polyolefin-siloxane copolymer.

Aspect 8. The thermoplastic composition according to any of Aspects 1 to 7, wherein the composition further comprises from greater than 0 wt % to 0.5 wt % of a β-nucleating agent for polypropylene.

Aspect 9. The thermoplastic composition according to Aspect 8, wherein the composition comprises from 0.1 wt % to 0.2 wt % of the β-nucleating agent for polypropylene.

Aspect 10. The thermoplastic composition according to any of Aspects 1 to 9, wherein the composition has a heat deflection temperature (HDT) that is from 10% to 100% greater than a substantially identical reference composition that does not include the polyolefin-siloxane copolymer, wherein HDT is determined in accordance with ASTM D648 or ISO 75 using a 1.82 MPa or 1.8 MPa load and a 3.2 mm or 80 mm×10 mm×4 mm specimen.

Aspect 11. The thermoplastic composition according to any of Aspects 1 to 10, wherein the composition has a notched Izod impact strength that is from 5% to 100% greater than a substantially identical reference composition that does not include the polyolefin-siloxane copolymer, wherein notched Izod impact strength is determined in accordance with ASTM D256 or ISO 180.

Aspect 12. The thermoplastic composition according to any of Aspects 1 to 11, wherein the composition has a flexural strength that is from 40% to 100% greater than a substantially identical reference composition that does not include the polyolefin-siloxane copolymer, wherein flexural strength is determined in accordance with ASTM D790.

Aspect 13. The thermoplastic composition according to any of Aspects 1 to 12, wherein the composition has a tensile strength that is from 20% to 80% greater than a substantially identical reference composition that does not include the polyolefin-siloxane copolymer, wherein tensile strength is determined in accordance with ASTM D638.

Aspect 14. The thermoplastic composition according to any of Aspects 1 to 13, wherein the composition has a tensile elongation that is from 40% to 100% greater than a substantially identical reference composition that does not include the polyolefin-siloxane copolymer, wherein tensile elongation is determined in accordance with ASTM D638.

Aspect 15. An article comprising the thermoplastic composition according to any of Aspects 1 to 14.

Aspect 16. The article of Aspect 15, wherein the article is a telecommunications device.

EXAMPLES

The following examples are put forth so as to provide those of ordinary skill in the art with a complete disclosure and description of how the compounds, compositions, articles, devices and/or methods claimed herein are made and evaluated, and are intended to be purely exemplary and are not intended to limit the disclosure. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric. Unless indicated otherwise, percentages referring to composition are in terms of wt %.

There are numerous variations and combinations of reaction conditions, e.g., component concentrations, desired solvents, solvent mixtures, temperatures, pressures and other reaction ranges and conditions that can be used to optimize the product purity and yield obtained from the described process. Only reasonable and routine experimentation will be required to optimize such process conditions.

Table 1 lists the typical extrusion profile of the developed compositions, and Table 2 lists the typical molding profile of the developed compositions.

TABLE 1

| Parameters | Unit | Condition |
|---|---|---|
| Compounder Type | NONE | TEM-37BS |
| Barrel Size | mm | 1500 |
| Die | mm | 4 |
| Feed (Zone 0) Temp | ° C. | 20 |
| Zone 1 Temp | ° C. | 40 |
| Zone 2 Temp | ° C. | 150 |
| Zone 3 Temp | ° C. | 230 |

TABLE 1-continued

| Parameters | Unit | Condition |
|---|---|---|
| Zone 4 Temp | ° C. | 230 |
| Zone 5 Temp | ° C. | 230 |
| Zone 6 Temp | ° C. | 230 |
| Zone 7 Temp | ° C. | 230 |
| Zone 8 Temp | ° C. | 230 |
| Zone 9 Temp | ° C. | 230 |
| Zone 10 Temp | ° C. | 230 |
| Zone 11 Temp | ° C. | 230 |
| Die Temp | ° C. | 230 |
| Screw speed | rpm | 300 |
| Throughput | kg/hr | 40 |
| Torque | NONE | 45-55 |
| Vacuum 1 | MPa | −0.08 |
| Side Feeder 1 speed | rpm | 300 |
| Melt temperature | NONE | 230-240 |

TABLE 2

| Parameters | Unit | Condition |
|---|---|---|
| Cnd: Pre-drying time | Hour | 2 |
| Cnd: Pre-drying temp | ° C. | 100 |
| Molding Machine | NONE | FANUC, ES3000 |
| Mold Type (insert) | NONE | ASTM tensile, ASTM flexural, ASTM Izod, ISO Izod, 100 mm × 70 mm × 1.6 mm plaque |
| Hopper temp | ° C. | 50 |
| Zone 1 temp | ° C. | 220-240 |
| Zone 2 temp | ° C. | 220-240 |
| Zone 3 temp | ° C. | 220-240 |
| Nozzle temp | ° C. | 220-240 |
| Mold temp | ° C. | 40-60 |
| Screw speed | rpm | 100 |
| Back pressure | kgf/cm$^2$ | 80 |
| Cooling time | s | 15-20 |
| Injection speed | mm/s | 50-150 |
| Holding pressure | kgf/cm$^2$ | 600-1000 |
| Max. Injection pressure | kgf/cm$^2$ | 800-1500 |

Thermoplastic compositions with low Dk (<2.8 at 1-5 GHz) and low Df (<0.003 at 1-5 GHz) properties and high stiffness, good ductility (low temperature), and good thermal performance were developed based on the building blocks of polypropylene, styrene-ethylene/butylene-styrene (SEBS), glass fiber, and a polyolefin-siloxane copolymer (e.g., Tegomer® PP-Si 401, available from Evonik). The formulations are shown in Table 3, including comparative compositions (C1.1, C1.2 and C1.3) that do not include the PP-Si copolymer. Various types of glass fibers were used in the compositions.

TABLE 3

| Item Description | Unit | C1.1 | E1.1 | C1.2 | E1.2 | C1.3 | E1.3 |
|---|---|---|---|---|---|---|---|
| SABIC PP block copolymer, PP85M10T | % | 71.6 | 70.6 | 71.6 | 70.6 | 71.6 | 70.6 |
| KRATON ™ SEBS G1651, Melt Index lower than 1 g/10 min at 230° C./5 kg | % | 8 | 8 | 8 | 8 | 8 | 8 |
| Tegomer ® PP-Si 401 from Evonik | % |  | 1 |  | 1 |  | 1 |
| Glass fiber 415CA from Nippon | % | 20 | 20 |  |  |  |  |
| Low Dk/Df glass fiber from CPIC | % |  |  | 20 | 20 |  |  |
| Flat glass fiber CSG3PA-830 from Nittobo | % |  |  |  |  | 20 | 20 |
| Anti-oxidant, AO 1010 | % | 0.1 | 0.1 | 0.1 | 0.1 | 0.1 | 0.1 |
| Phosphite Stabilizer, AO 168 | % | 0.1 | 0.1 | 0.1 | 0.1 | 0.1 | 0.1 |
| HALS 770 | % | 0.2 | 0.2 | 0.2 | 0.2 | 0.2 | 0.2 |

Properties of the compositions are shown in Table 4. Comparing E1.1 and C1.1, the ductility of E1.1 was increased with the addition of the polyolefin-siloxane copolymer (PP-Si), especially the low temperature (−40 degrees Celsius (° C.)) impact strength, changing from 64 joules per meter (J/m) to 84 J/m. HDT of the sample was also improved, increasing from 116° C. to as high as 136° C. at 1.82 MPa (around 20° C. higher). Significantly, flexural and tensile strength of E1.1 were greatly enhanced (increase >40%), indicating that stiffness of the sample was highly improved. For the dielectric performance, no obvious difference was seen in the Dk level. Finally, while Df increased, it was still kept at a relatively low level, i.e. <0.002 at 1.9 GHz.

Compositions with other kinds of glass fiber were also evaluated. As shown in E1.2, when the low Dk/Df glass fiber was used as the filler, the composition including the polyolefin-siloxane copolymer showed quite similar mechanical performance (impact, tensile and flexural) as that without the PP-Si copolymer (C1.2). Although the room temperature impact strength of the samples was much higher than that of the sample in E1.1 (253 J/m vs. 140 J/m), their low temperature (−40° C.) impact performance was much lower (67 J/m vs. 84 J/m). For the thermal stability, addition of the polyolefin-siloxane copolymer resulted in an even lower HDT (compare E1.2 to C1.2). Accordingly, it was seen that when the low Dk/Df glass fiber was used as the filler, the PP-Si copolymer did not further improve stiffness, low temperature ductility, and thermal performance of the composition. E1.3 and C1.3 used a flat glass fiber (CSG3PA-830 from Nittobo) as the filler. From the data, impact performance was much higher than that of the sample in E1.1. However, no substantial difference was found between the two samples with and without the polyolefin-siloxane copolymer (compare E1.3 to C1.3). Moreover, stiffness of the sample (tensile and flexural strength) was not increased with the addition of the polyolefin-siloxane copolymer in the composition.

Comparing E1.1, E1.2, and E1.3, it is believed that fiber sizing could be a major contributor to the performance difference between the glass fibers. Thus, for the disclosed compositions, it may be desirable to use glass fibers with polyolefin sizing or with other sizing that is compatible to polyolefin.

TABLE 4

| Typical Property | Test Method | Test Description | Unit | C1.1 | E1.1 | C1.2 | E1.2 | C1.3 | E1.3 |
|---|---|---|---|---|---|---|---|---|---|
| Density | Specific Gravity | ASTM D792 | g/cm$^3$ | 1.035 | 1.035 | 1.025 | 1.024 | 1.034 | 1.033 |
| MVR | 230° C./10 kg | ASTM D1238 | cm$^3$/10 min | 25.3 | 29.6 | 20.1 | 24.2 | 14.1 | 16.4 |
| Notched IZOD | 23° C., 5 lbf/ft | ASTM D256 | J/m | 130 | 140 | 240 | 253 | 239 | 251 |
| Notched IZOD | −40° C., 5 lbf/ft | ASTM D256 | J/m | 64 | 84 | 62 | 67 | 85 | 88 |
| Ductility | −40° C., 5 lbf/ft | ASTM D256 | % | 100 | 100 | 100 | 100 | 100 | 100 |
| Notched IZOD | 23° C., 5 lbf/ft | ISO 180 | kJ/m$^2$ | 11.3 | 12.6 | 21.0 | 22.7 | 20.3 | 21.1 |
| Notched IZOD | −40° C., 5 lbf/ft | ISO 180 | kJ/m$^2$ | 6.2 | 8.1 | 6.1 | 6.8 | 8.7 | 8.4 |
| Ductility | −40° C., 5 lbf/ft | ISO 180 | % | 100 | 100 | 100 | 100 | 100 | 100 |
| HDT | 0.45 MPa, 3.2 mm | ASTM D648 | ° C. | 155 | 159 | 143 | 141 | 145 | 156 |
| HDT | 1.82 MPa, 3.2 mm | ASTM D648 | ° C. | 116 | 136 | 99 | 77 | 105 | 115 |
| HDT | 0.45 MPa, 80 mm × 10 mm × 4 mm | ISO 75 | ° C. | 150 | 157 | 139 | 136 | 142 | 151 |
| HDT | 1.8 MPa, 80 mm × 10 mm × 4 mm | ISO 75 | ° C. | 108 | 127 | 90 | 71 | 101 | 105 |
| Flexural Modulus | 3.2 mm, 1.27 mm/min | ASTM D790 | MPa | 3110 | 3370 | 3130 | 3320 | 3420 | 3450 |
| Flexural Strength | @break, 3.2 mm, 1.27 mm/min | ASTM D790 | MPa | 49 | 75 | 38 | 37 | 38 | 35 |
| Tensile Modulus | 50 mm/min | ASTM D638 | MPa | 3740 | 4190 | 3550 | 3970 | 3850 | 3900 |
| Tensile Strength | @yield, 50 mm/min | ASTM D638 | MPa | / | / | / | 23 | 24 | 21 |
| Tensile Strength | @break, 50 mm/min | ASTM D638 | MPa | 40 | 57 | 15 | 11 | 12 | 10 |
| Tensile Elongation | @break, 50 mm/min | ASTM D638 | % | 1.8 | 2.8 | 3.6 | 5.7 | 8.4 | 8.9 |
| Dk | 1.9 GHz | SABIC Method | / | 2.49 | 2.50 | 2.39 | 2.39 | 2.51 | 2.51 |
| Df | 1.9 GHz | SABIC Method | / | 1.5E−3 | 1.8E−3 | 1.1E−3 | 1.4E−3 | 1.6E−3 | 1.9E−3 |
| Dk | 5 GHz | SABIC Method | / | 2.54 | 2.54 | 2.44 | 2.45 | 2.55 | 2.57 |
| Df | 5 GHz | SABIC Method | / | 1.9E−3 | 2.1E−3 | 1.4E−3 | 1.7E−3 | 2.0E−3 | 2.3E−3 |

As described above and below, the "SABIC Method" for determining Dk and Df includes measuring these values using a QWED split post dielectric resonator and an Agilent network analyzer. For the 1.9 GHz measurement, the minimum sample size is 70 mm×70 mm; the maximum sample thickness is 4 mm. For the 5 GHz measurement, the minimum sample size is 30 mm×30 mm; the maximum sample thickness is 2 mm. The test samples were prepared according to an injection molding process (as described above), and had a size of 100 mm×70 mm×1.6 mm in accordance with the above specifications.

Additional example and comparative compositions were made and are shown in Table 5. E2.1 and E2.2 contain a high loading of the polyolefin-siloxane copolymer. E2.3 includes a β-nucleating agent in the formulation to improve impact performance. E2.4 has a glass fiber loading of 30 wt %. Comparative composition C2.1 does not include a polyolefin-siloxane copolymer. Properties of these compositions are shown in Table 6.

TABLE 5

| Item Description | Unit | C2.1 | E2.1 | E2.2 | E2.3 | E2.4 |
|---|---|---|---|---|---|---|
| SABIC PP block copolymer, PP85M10T | % | 67.6 | 64.6 | 63.6 | 64.5 | 54.6 |
| KRATON ™ SEBS G1651, Melt Index lower than 1 g/10 min at 230° C./5 kg | % | 12 | 12 | 12 | 12 | 12 |
| Tegomer ® PP-Si 401 from Evonik | % | | 3 | 4 | 3 | 3 |
| Glass fiber 415CA from Nippon | % | 20 | 20 | 20 | 20 | 30 |
| NAB-82, β-nucleating agent | % | | | | 0.1 | |
| Anti-oxidant, AO 1010 | % | 0.1 | 0.1 | 0.1 | 0.1 | 0.1 |

TABLE 5-continued

| Item Description | Unit | C2.1 | E2.1 | E2.2 | E2.3 | E2.4 |
|---|---|---|---|---|---|---|
| Phosphite Stabilizer, AO 168 | % | 0.1 | 0.1 | 0.1 | 0.1 | 0.1 |
| HALS 770 | % | 0.2 | 0.2 | 0.2 | 0.2 | 0.2 |

TABLE 6

| Typical Property | Test Method | Test Description | Unit | C2.1 | E2.1 | E2.2 | E2.3 | E2.4 |
|---|---|---|---|---|---|---|---|---|
| Density | Specific Gravity | ASTM D792 | g/cm$^3$ | 1.036 | 1.035 | 1.038 | 1.039 | 1.117 |
| MVR | 230° C./10 kg | ASTM D1238 | cm$^3$/10 min | 30.6 | 44.5 | 46.8 | 40.0 | 23.3 |
| Notched IZOD | 23° C., 5 lbf/ft | ASTM D256 | J/m | 128 | 156 | 198 | 193 | 201 |
| Notched IZOD | −40° C., 5 lbf/ft | ASTM D256 | J/m | 60 | 93 | 100 | 108 | 116 |
| Ductility | −40° C., 5 lbf/ft | ASTM D256 | % | 100 | 100 | 100 | 100 | 100 |
| Notched IZOD | 23° C., 5 lbf/ft | ISO 180 | kJ/m$^2$ | 12.2 | 15.3 | 16.5 | 17.4 | 17.9 |
| Notched IZOD | −40° C., 5 lbf/ft | ISO 180 | kJ/m$^2$ | 6.3 | 9.2 | 10.1 | 10.4 | 11.5 |
| Ductility | −40° C., 5 lbf/ft | ISO 180 | % | 100 | 100 | 100 | 100 | 100 |
| HDT | 0.45 MPa, 80 mm × 10 mm × 4 mm | ISO 75 | ° C. | 151 | 157 | 157 | 152 | 161 |
| HDT | 1.8 MPa, 80 mm × 10 mm × 4 mm | ISO 75 | ° C. | 112 | 132 | 131 | 134 | 145 |
| Flexural Modulus | 3.2 mm, 1.27 mm/min | ASTM D790 | MPa | 3250 | 3330 | 3410 | 3590 | 5300 |
| Flexural Strength | @break, 3.2 mm, 1.27 mm/min | ASTM D790 | MPa | 50 | 76 | 77 | 75 | 94 |
| Tensile Modulus | 50 mm/min | ASTM D638 | MPa | 3295 | 3620 | 3680 | 3430 | 5400 |
| Tensile Strength | @break, 50 mm/min | ASTM D638 | MPa | 39 | 53 | 53 | 52 | 67 |
| Tensile Elongation | @break, 50 mm/min | ASTM D638 | % | 1.9 | 3.1 | 3.4 | 3.3 | 2.8 |
| Dk | 1.9 GHz | SABIC Method | / | 2.51 | 2.51 | 2.53 | 2.52 | 2.68 |
| Df | 1.9 GHz | SABIC Method | / | 1.6E−3 | 2.2E−3 | 2.5E−3 | 2.3E−3 | 2.8E−3 |
| Dk | 5 GHz | SABIC Method | / | 2.55 | 2.56 | 2.56 | 2.56 | 2.72 |
| Df | 5 GHz | SABIC Method | / | 2.0E−3 | 2.5E−3 | 2.8E−3 | 2.6E−3 | 3.1E−3 |

As shown in E2.1 and C2.1, when the polyolefin-siloxane copolymer loading was 3%, impact strength of the sample was greatly highly improved, changing from 128 J/m and 60 J/m to 156 J/m and 93 J/m at 23° C. and −40° C., respectively. When the loading of the polyolefin-siloxane copolymer was increased to 4 wt %, impact performance was further improved to as high as 198 J/m at 23° C. and 100 J/m at −4° C. (E2.2). Thermal and mechanical performance of the samples also improved, showing an around 20° C. increase for the HDT at 1.8 MPa and >35% improvement for the tensile and flexural strength (E2.1 and E2.2). When the β-nucleating agent was used in the composition, the impact performance was further improved. As shown in E2.3, with the use of 0.1% β-nucleating agent in the formulation, notched Izod impact strength was improved while the thermal, mechanical and dielectric performance was comparable to that of the sample without the β-nucleating agent (compare E2.3 to E2.1). When the glass fiber content was increased the composition had improved ductility, high stiffness and good thermal performance (E2.4).

Conclusion: thermoplastic compositions having a low Dk, low Df, and improved stiffness, ductility and thermal performance were developed using the basic building blocks of PP, SEBS, glass fiber and a polyolefin-siloxane-copolymer. The compositions showed stable dielectric properties and good mechanical and processing performance. Compositions according to the disclosure had much higher impact strength (and in particular low temperature impact strength), improved tensile and flexural strength, and better thermal stability as compared to conventional compositions. The Dk and Df of the disclosed compositions could be maintained at a low level, i.e., Dk<2.8 and Df<0.003 at 1-5 GHz.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A thermoplastic composition comprising:
   from 48.9 wt % to 93.9 wt % of a thermoplastic resin component comprising polypropylene, polypropylene copolymer, or combinations thereof;
   from 5 wt % to 50 wt % glass fiber, wherein the glass fiber is sized so as to be compatible with the thermoplastic resin component;
   from 1 wt % to 30 wt % impact modifier; and
   from 0.1 wt % to 10 wt % of a polyolefin-siloxane copolymer,
   wherein
   the thermoplastic composition has a dielectric constant (Dk) of less than 2.8 at from 1-5 gigahertz (GHz) and a dissipation factor (Df) of less than 0.003 at from 1-5 GHz,
   the combined weight percent value of all components does not exceed 100 wt %, and
   all weight percent values are based on the total weight of the composition.

2. The thermoplastic composition of claim 1, wherein the composition comprises 65 wt % to 85 wt % of the thermoplastic resin component.

3. The thermoplastic composition of claim 1, wherein the composition comprises from 5 wt % to 15 wt % impact modifier.

4. The thermoplastic composition of claim 1, wherein the impact modifier is selected from the group consisting of: styrene-ethylene/butylene-styrene (SEBS); syndiotactic polystyrene (SPS); styrene-ethylene-propylene-styrene (SEPS); and combinations thereof.

5. The thermoplastic composition of claim 1, wherein the impact modifier is a low flow SEBS compound having a melt flow index less than 1 gram per 10 minute (g/10 min) at 230 degrees Celsius (° C.) and 5 kilograms (kg).

6. The thermoplastic composition of claim 1, wherein the composition comprises from 1 wt % to 5 wt % polyolefin-siloxane copolymer.

7. The thermoplastic composition of claim 1, wherein the composition further comprises from greater than 0 wt % to 0.5 wt % of a β-nucleating agent for polypropylene.

8. The thermoplastic composition of claim 7, wherein the composition comprises from 0.1 wt % to 0.2 wt % of the β-nucleating agent for polypropylene.

9. The thermoplastic composition of claim 1, wherein the composition has a heat deflection temperature (HDT) that is from 10% to 100% greater than a substantially identical reference composition that does not include the polyolefin-siloxane copolymer, wherein HDT is determined in accordance with ASTM D648 or ISO 75 using a 1.82 or 1.8 megapascal (MPa) load and a 3.2 millimeter (mm) or 80 mm×10 mm×4 mm specimen.

10. The thermoplastic composition of claim 1, wherein the composition has a notched Izod impact strength that is from 5% to 100% greater than a substantially identical reference composition that does not include the polyolefin-siloxane copolymer, wherein notched Izod impact strength is determined in accordance with ASTM D256 or ISO 180.

11. The thermoplastic composition of claim 1, wherein the composition has a flexural strength that is from 40% to 100% greater than a substantially identical reference composition that does not include the polyolefin-siloxane copolymer, wherein flexural strength is determined in accordance with ASTM D790.

12. The thermoplastic composition of claim 1, wherein the composition has a tensile strength that is from 20% to 80% greater than a substantially identical reference composition that does not include the polyolefin-siloxane copolymer, wherein tensile strength is determined in accordance with ASTM D638.

13. The thermoplastic composition of claim 1, wherein the composition has a tensile elongation that is from 40% to 100% greater than a substantially identical reference composition that does not include the polyolefin-siloxane copolymer, wherein tensile elongation is determined in accordance with ASTM D638.

14. An article comprising the thermoplastic composition of claim 1, wherein the article is a telecommunications device.

15. A thermoplastic composition comprising:
   from 65 wt % to 85 wt % of a thermoplastic resin component comprising polypropylene, polypropylene copolymer, or combinations thereof;
   from 5 wt % to 50 wt % glass fiber;
   from 1 wt % to 30 wt % impact modifier; and
   from 0.1 wt % to 10 wt % of a polyolefin-siloxane copolymer,
   wherein
   the thermoplastic composition has a dielectric constant (Dk) of less than 2.8 at from 1-5 gigahertz (GHz) and a dissipation factor (Df) of less than 0.003 at from 1-5 GHz,
   the combined weight percent value of all components does not exceed 100 wt %, and
   all weight percent values are based on the total weight of the composition.

16. A thermoplastic composition comprising:
   from 48.9 wt % to 93.9 wt % of a thermoplastic resin component comprising polypropylene, polypropylene copolymer, or combinations thereof;
   from 5 wt % to 50 wt % glass fiber;
   from 1 wt % to 30 wt % impact modifier;
   from 0.1 wt % to 10 wt % of a polyolefin-siloxane copolymer; and from 0.1 wt % to 0.2 wt % of a β-nucleating agent for polypropylene, wherein the thermoplastic composition has a dielectric constant (Dk) of less than 2.8 at from 1-5 gigahertz (GHz) and a dissipation factor (Df) of less than 0.003 at from 1-5 GHz, the combined weight percent value of all components does not exceed 100 wt %, and all weight percent values are based on the total weight of the composition.

* * * * *